United States Patent [19]

Hawkins et al.

[11] 4,227,551
[45] Oct. 14, 1980

[54] TUBE BANKS

[75] Inventors: Ronald J. Hawkins, Morden; Anthony E. Ruffell, Maidenhead, both of England

[73] Assignee: Babcock & Wilcox, Limited, London, England

[21] Appl. No.: 930,693

[22] Filed: Aug. 3, 1978

[51] Int. Cl.³ .............................................. F16D 1/02
[52] U.S. Cl. ....................................... 138/40; 138/38; 138/89; 138/111
[58] Field of Search ................. 138/42, 40, 89, 38, 138/111, 46

[56] References Cited

U.S. PATENT DOCUMENTS

| | | | |
|---|---|---|---|
| 2,061,949 | 11/1936 | Monroe | 138/38 |
| 3,551,995 | 1/1971 | Marechal | 138/89 |
| 3,911,794 | 10/1975 | Cheshir | 138/111 |
| 4,106,525 | 8/1978 | Currie et al. | 138/46 |

Primary Examiner—Lenard A. Footland
Attorney, Agent, or Firm—Kemon & Estabrook

[57] ABSTRACT

Flow restricting devices are provided for individual tubes connected into bores in a tube bank and are each formed with a convoluted passage of restricted cross-sectional area and extended length to produce a required flow restriction.

1 Claim, 7 Drawing Figures

TUBE BANKS

This invention relates to tube banks including tubes connected into respective bores in a tube plate, and, more particularly, to tube banks including devices, such as ferrules, serving to restrict flow of fluid to individual tubes in order to achieve required flow conditions in the individual tubes.

According to the present invention, a tube bank including tubes connected into bores in a tube plate is provided with flow restricting devices located in register with individual tubes at end regions thereof and each having a convoluted passage of such form, extended length and reduced cross-sectional area as to give rise to a required flow restriction.

In one arrangement, each flow restricting device includes a cylindrical plug provided with end closure plates and formed between end faces with a plurality of axially extending bores sequentially connected together by means of grooves in the end faces to form the convoluted passage as a continuous passage extending between an inlet aperture in one end plate and an outlet aperture in the other end plate.

In an alternative arrangement, each flow restricting device includes a cylindrical plug having a cylindrical surface arranged to be a tight fit within the tube plate bore formed with a spiral groove communicating with an aperture in a head portion of the cylindrical plug seal welded to the tube plate, the aperture and the spiral groove constituting the convoluted passage.

In a further arrangement, each flow restricting device includes at least two plates or discs secured together with faces in close abutment and with one of the plates or discs seal welded to the tube plate, a groove being formed in one of the abutting faces connecting an axial bore through one plate or disc with an axial bore through the other disc, the bores being displaced the one from the other.

The invention will now be described, by way of example, with reference to the accompanying, partly diagrammatic drawings, in which.

Figure 1:
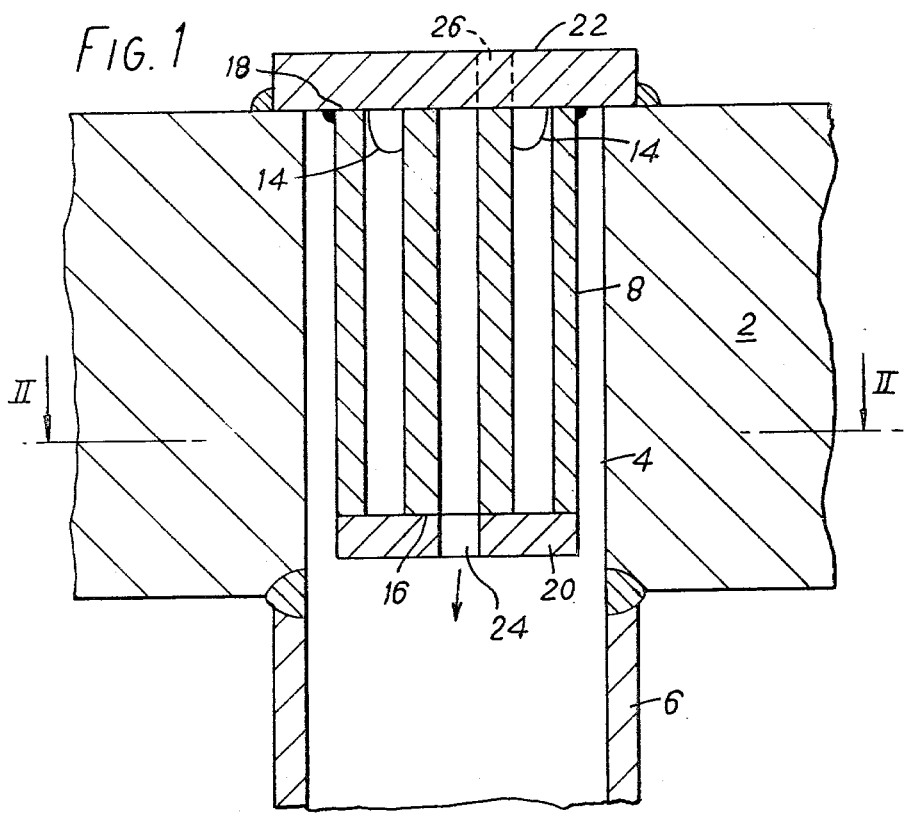
FIG. 1 is an axial cross-section through the flow restricting device in the form of a cylindrical plug, together with portions of an associated tube plate and tube.
Figure 2:
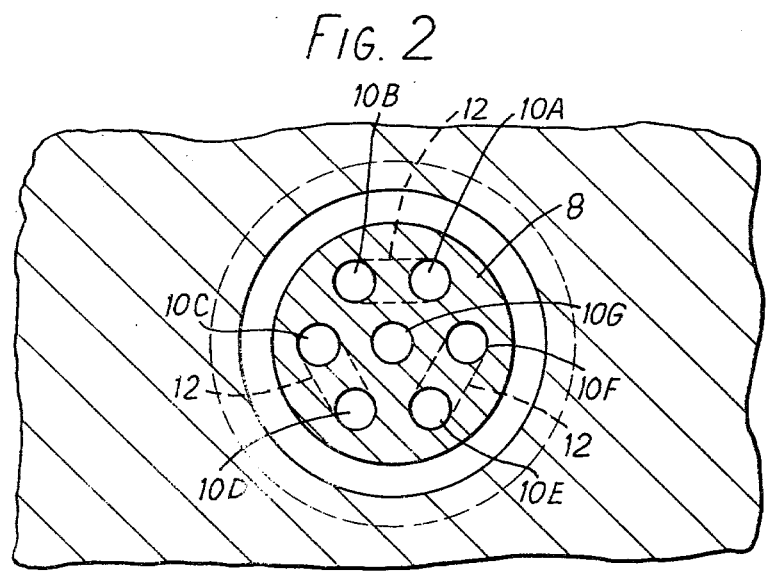
FIG. 2 is a cross-sectional plan view taken on the line II—II of FIG. 1.

Referring to the drawings, as shown in FIGS. 1 and 2, a tube plate 2 having a bore 4 and tube 6 welded thereto is provided with a cylindrical plug 8 of a diameter slightly less than the diameter of tube plate bore 4 diameter. Seven, axially extending, parallel, small diameter, bores 10A-G are formed in the plug, six of the bores 10A-F being spaced at equi-angular intervals around the seventh 10G, which extends co-axially of the plug 8. Grooves 12, 14 are formed in the plug end faces 16, 18 which, in conjunction with end closure plates 20, 22, sequentially connect the bores as a serpentine passage. Thus, the grooves 12 in the end face 16 connect the end portions of the first 10A and second 10B, third 10C and fourth 10D and fifth 10E and sixth 10F bores whilst the grooves 14 in the end face 18 connect the second 10B and third 10C, fourth 10D and fifth 10E and sixth 10F and seventh 10G bores. The end closure plate 20 which is equal in diameter to the plug is circumferentially seal welded co-axially to the plug in abutment with the end faces 16 and is formed with a central, outlet, aperture 24 which registers with the seventh bore 10G in the plug. The end plate 22 of diameter exceeding the tube plate bore diameter is circumferentially seal welded co-axially to the plug in abutment with the end face 18 and is formed with an eccentrically positioned, inlet aperture 26 which registers with the first bore 10A in the plug.

In construction and use, the cylindrical plugs 8 are positioned as required in the tube plate 8 during fabrication or servicing of the tube bank, the factors of the geometry of each plug, that is, number of bores and the length and diameter of bores, being determined in relation to the flow restriction required for individual tubes. Since flow restriction is achieved by the effect of flow through the serpentine passage, a larger diameter inlet aperture 26 is possible compared with a ferrule in which flow restriction is achieved solely by use of an aperture or by use of an aperture discharging to a short, straight, capillary passage. Since smaller diameter apertures and, when utilised, capillary passages are more liable to be eroded than apertures and passages of greater diameter and since the effect of erosion will reduce the flow restriction to a greater degree, the useful life of the foregoing flow restricting device will be appreciably greater than that of a ferrule merely utilising an aperture or utilising an aperture discharging to a short, straight, capillary passage to achieve the same flow restriction.

Figure 3:
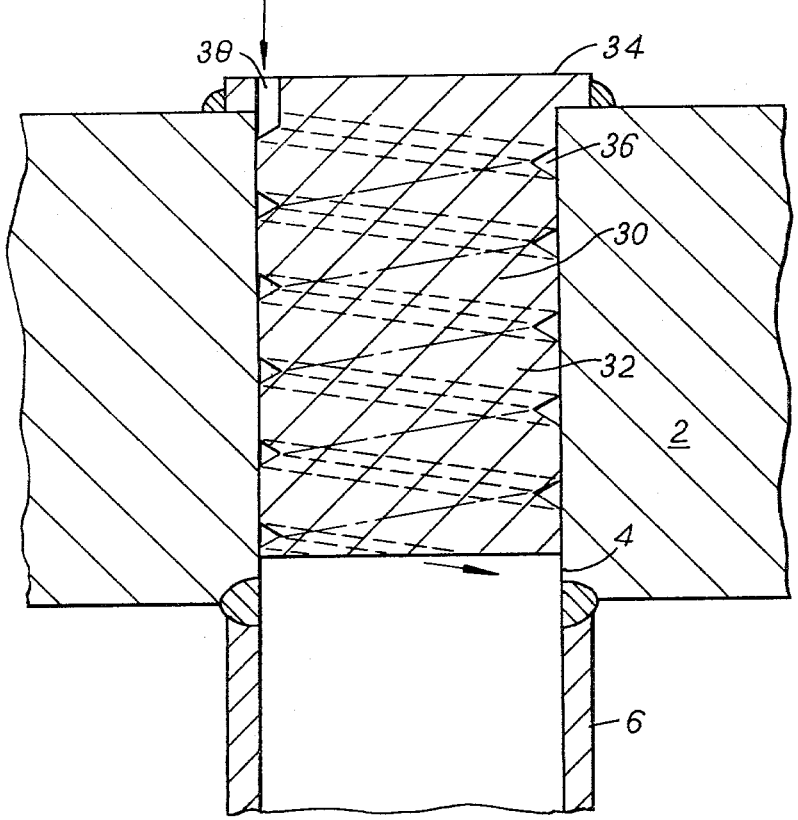
FIG. 3 is an axial cross-section through an alternative form of the flow restricting device.

In the arrangement shown in FIG. 3, the flow restricting devices takes the form of a threaded plug 30 having a body portion 32 equal in diameter to the tube plate bore 4 and a head portion 34 greater in diameter than the tube plate bore. A single start, spiral, V-section groove 36 is formed in the cylindrical surface of the body portion, running off at the end remote from the head portion and, adjacent the head portion, communicating with an inlet aperture 38 in the head portion. The threaded plug is positioned in the tube plate bore as a close fit with the shoulder of the head portion 34 in abutment with the tube plate face remote from the tube 16 and is circumferentially seal welded to the tube plate 2. A spirally extending passage is thus formed between the wall of the tube plate bore and the sides of the single start, spiral, V-section groove and provides a flow restricting passage extending from the inlet aperture 38 in the head portion to the run-out from the groove discharging into the tube plate bore.

In construction and use, as with the device shown in FIGS. 1 and 2, the threaded plugs 30 are positioned as required during fabrication or servicing of the tube bank, the depth and length of the groove being determined in accordance with the flow restriction required. As with those devices, the life of the threaded plug device will be appreciably greater than that of a ferrule merely utilising an aperture or utilising an aperture discharging to a short straight capillary passage to achieve the same flow restriction.

It will be appreciated that profiles other than V-section may be used for the spiral groove.

In a modified form, not shown, a threaded cylindrical plug is a close fit within a cylindrical sleeve which, in turn, is a close fit within the bore in the tube plate. The cylindrical sleeve is formed with an outwardly directed circumferential flange which is seal welded to the tube plate and an inwardly directed flange at one end to retain the cylindrical plug. After inserting the plug into the sleeve the end of the sleeve remote from the end with the inwardly directed flange is spun in, or otherwise urged inwardly, completely to retain the plug. The run-off of the thread at respective ends of the threaded plug forms the inlet to and outlet from the passage formed between the land of the thread and the inner wall of the cylindrical sleeve.

Figure 4:
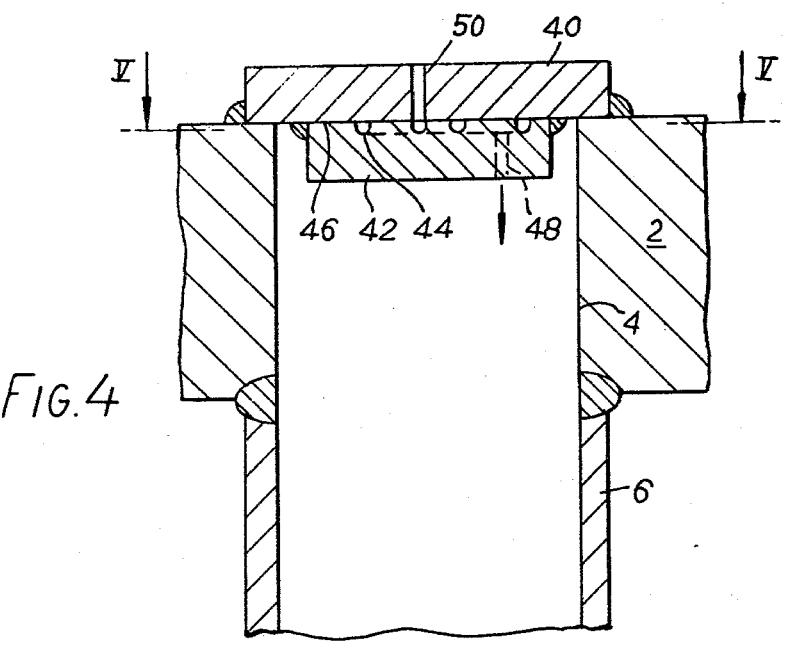
FIG. 4 is an axial cross-section through a further alternative form of the flow restricting device.
Figure 5:
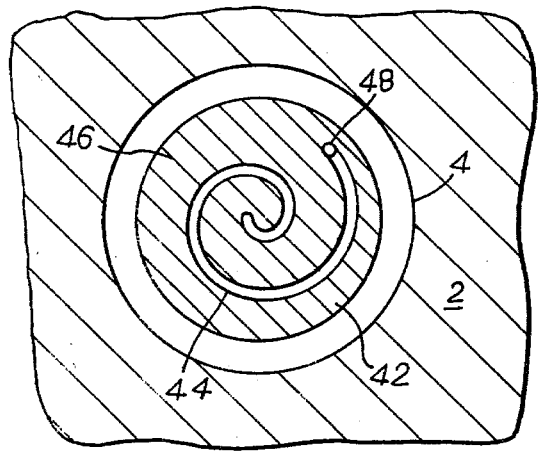
FIG. 5 is a cross-sectional plan view taken on the line V—V of FIG. 4.

In the further alternative arrangement shown in FIGS. 4 and 5, a cover disc 40 is seal welded to the tube plate 2 in register with the bore 4 and has a smaller diameter disc 42 seal welded in close abutment thereto extending into the tube bore. The smaller disc 42 is formed with a spiral groove 44 in a face 46 and is penetrated by an axially extending aperture 48 registering with an outer end of the spiral groove. The cover disc 40 is penetrated by an axially extending aperture 50 registering with the inner end of the spiral groove 44 so that a convoluted passage is formed from the aperture 50 to the aperture 48 penetrating the discs.

In construction and use, the flow restricting device of FIGS. 4 and 5 is similar to that shown in the preceding figures. Where it is required to increase the flow restrictive effect, an additional disc is, or additional discs are, welded in register with the smaller disc 42, the or each additional disc or discs being formed with a spiral groove similar to the groove 44 and being penetrated by an axially extending aperture similar to either the aperture 48 or the aperture 50 to form a continuous convoluted passage through the discs.

Figure 6:
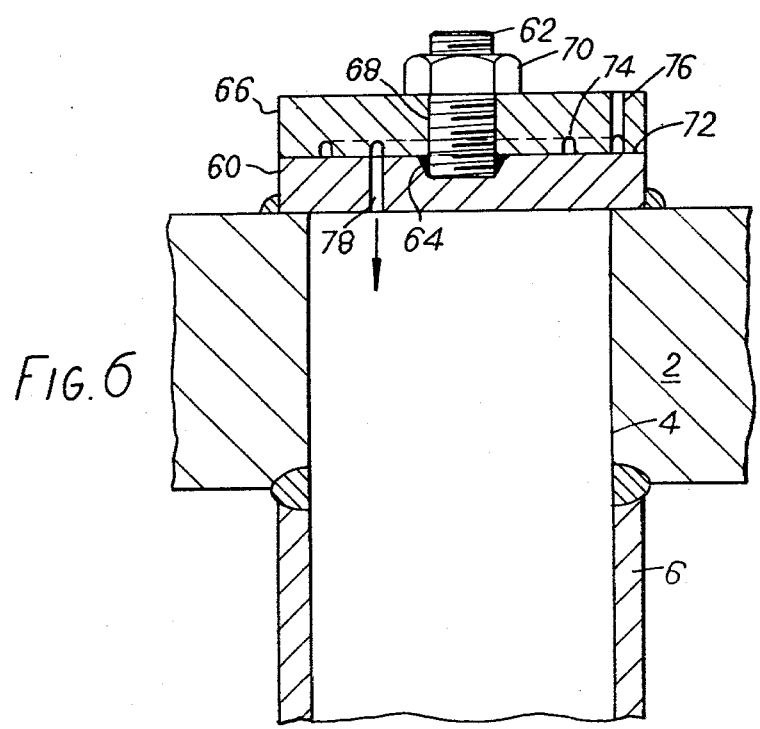
FIG. 6 is an axial cross-section through a yet further alternative form of flow restricting device.
Figure 7:
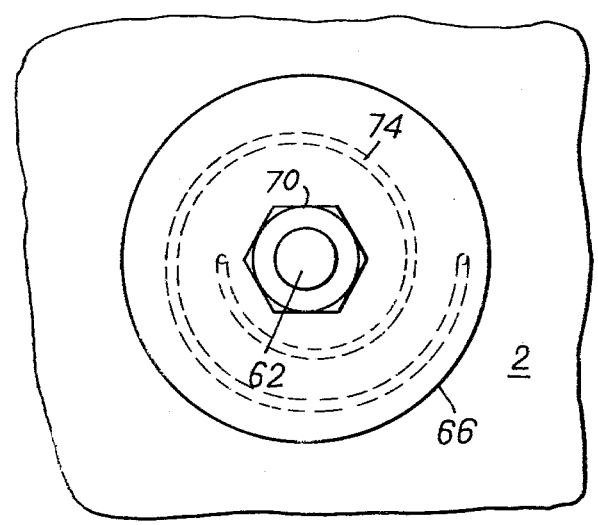
FIG. 7 is a plan view corresponding to FIG. 6.

In the yet further alternative arrangement shown in FIGS. 6 and 7, a cover disc 60 is seal welded to the tube plate 2 in register with the bore 4 and has a stud bolt 62 welded into a central recess 64. An outer disc 66 having a central bolt hole 68 is secured in register with the cover disc 60 by means of a nut 70 co-acting with the stud bolt 62. A face 72 of the outer disc 66 abutting the cover disc 60 is formed with a spiral groove 74 extending from an axial aperture 76 in the outer disc 66 to an axial aperture 78 in the cover disc to form a convoluted passage between the aperture 76 and the aperture 78. It will be appreciated that an additional disc or additional discs may be added in a manner similar to that described in connection with FIGS. 4 and 5, to increase the flow restrictive effect. Registration means (not shown) are formed on the discs to ensure correct alignment thereof. The bolted connection is readily releasable, thereby facilitating assembly of devices with differing flow restrictive effects and variation, by replacement of the outer disc or discs, of existing devices where it is desired to vary the flow restrictive effect.

We claim:

1. A tube bank having a tube plate with inner and outer faces, bores penetrating the tube plate and tubes connected to the bores adjacent the inner face of the tube plate, in which each bore is obturated with a flow restricting device comprising a cylindrical plug having a cylindrical surface arranged to be a tight fit within the tube plate bore and having an outwardly directed flanged head portion formed with an aperture and seal welded to the outer face of the tube plate, a spiral groove formed in the cylindrical surface of the cylindrical plug connecting the aperture in the flanged head portion with the interior of the respective tube, the spiral groove and the aperture together forming a passage having a length in excess of the bore diameter and being dimensioned in conjunction with the passage cross-sectional area to give rise to a required flow restriction.

* * * * *